(12) United States Patent
Jaconelli et al.

(10) Patent No.: US 7,530,775 B2
(45) Date of Patent: May 12, 2009

(54) FASTENER

(75) Inventors: Håkan Jaconelli, Alingsås (SE); Jonas Malmenslam, Alingsås (SE)

(73) Assignee: Autoliv Development AB, Vargarda (SE)

( * ) Notice: Subject to any disclaimer, the term of this patent is extended or adjusted under 35 U.S.C. 154(b) by 22 days.

(21) Appl. No.: 10/551,626

(22) PCT Filed: Jan. 16, 2004

(86) PCT No.: PCT/SE2004/000044

§ 371 (c)(1),
(2), (4) Date: Jun. 13, 2006

(87) PCT Pub. No.: WO2004/088153

PCT Pub. Date: Oct. 14, 2004

(65) Prior Publication Data

US 2006/0239795 A1    Oct. 26, 2006

(30) Foreign Application Priority Data

Apr. 2, 2003    (GB) ................................ 0307644.5

(51) Int. Cl.
*F16B 35/00*    (2006.01)

(52) U.S. Cl. ...................... 411/383; 411/386; 411/302

(58) Field of Classification Search ................ 411/383, 411/386, 377, 970, 510, 302, 999
See application file for complete search history.

(56) References Cited

U.S. PATENT DOCUMENTS

| | | | | |
|---|---|---|---|---|
| 3,466,966 A * | 9/1969 | Brown | ......................... | 411/510 |
| 3,501,993 A * | 3/1970 | Swenson | .................... | 411/393 |
| 3,817,146 A * | 6/1974 | Scott | ......................... | 411/384 |
| 4,810,145 A * | 3/1989 | Villas | ......................... | 411/206 |
| 5,306,098 A * | 4/1994 | Lewis | ......................... | 411/510 |
| 5,356,255 A * | 10/1994 | Takahashi et al. | .......... | 411/431 |
| 5,967,725 A | 10/1999 | Voges | | |
| 6,116,832 A * | 9/2000 | Wolf et al. | .................. | 411/383 |
| 2008/0038086 A1* | 2/2008 | Dietz et al. | ................. | 411/386 |

FOREIGN PATENT DOCUMENTS

| | | |
|---|---|---|
| DE | 100 42 307 A1 | 3/2002 |
| GB | 1062372 | 3/1967 |
| GB | 1204853 | 9/1970 |

* cited by examiner

*Primary Examiner*—Flemming Saether
(74) *Attorney, Agent, or Firm*—Brinks Hofer Gilson & Lione

(57) ABSTRACT

A fastener is provided including a bolt. The bolt has a head and a threaded shank extending from the head. The threaded shank is dimensioned to co-operate with a predetermined threaded bore, with the free end of the shank remote from the head being provided with an end cap and the end cap having a yieldable formation to engage frictionally with the threaded bore.

7 Claims, 2 Drawing Sheets

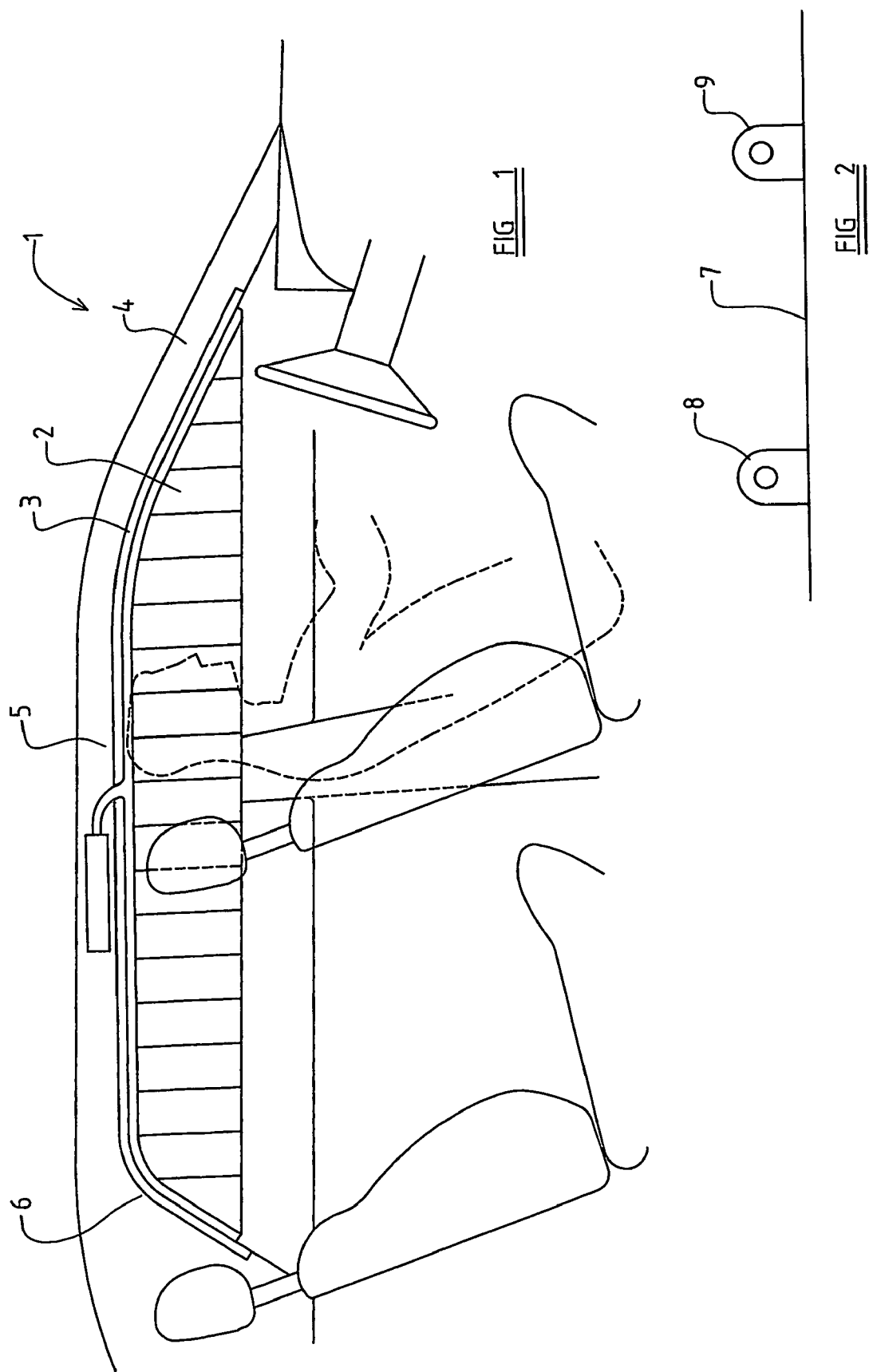

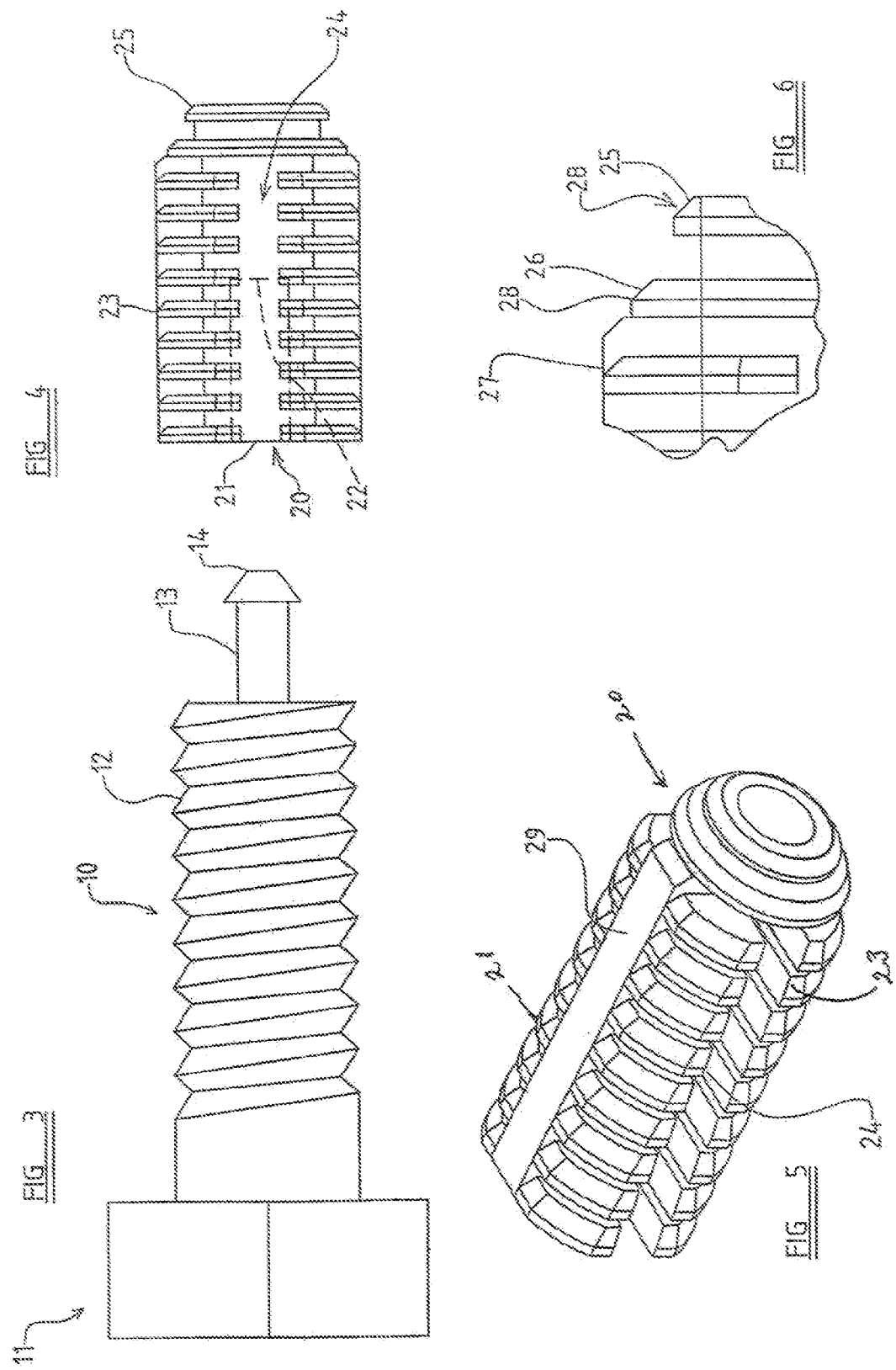

FASTENER

CROSS REFERENCE TO RELATED APPLICATIONS

This application claims priority to British patent application 0307644.5, filed Apr. 2, 2003 and PCT/SE2004/000044, filed Jan. 16, 2004.

BACKGROUND OF THE INVENTION

The present invention relates to a fastener which may be useful in securing in position, within a vehicle, an air-bag of the "inflatable curtain" type.

BRIEF SUMMARY OF THE INVENTION

A conventional inflatable curtain air-bag, when initially assembled, is contained within a long package, with a plurality of mounting lugs extending from the package. Each mounting lug is to be secured to an appropriate mount provided within a motor vehicle. If each mount is in the form of a threaded hole which is to receive a bolt passing through the lug, it is often difficult for the package to be held in position whilst the bolts are introduced through the lugs and engaged with the threaded bores.

The present invention seeks to provide an improved fastener useful for securing an air-bag in position in a motor vehicle, and may also be useful for many other applications.

Accordingly, the present invention provides a fastener including a bolt, the bolt having a head and a threaded shank extending from the head, the threaded shank being dimensioned to co-operate with a predetermined threaded bore, the free end of the shank remote from the head being provided with an end cap, the end cap having a yieldable formation to engage frictionally with the threaded bore.

Preferably, the end cap is a separate component which is secured to the bolt.

Advantageously, the end cap is rotatably mounted on the bolt.

Conveniently, the shank of the bolt is provided with an axially extending projection having an enlarged head, the cap having an internal bore dimensioned to receive the projection and the head.

Preferably, the end cap is provided with a plurality of radially outwardly extending flanges.

Advantageously, at least some of the flanges have a diameter greater than the diameter of the threaded shank of the bolt.

Conveniently, at least some of the flanges have chamfered leading edges.

Preferably, at least some of the flanges are segmented.

Advantageously, at least a terminal flange has a diameter less than that of succeeding flanges.

The present invention also provides a method of mounting an inflatable curtain in position in a motor vehicle, the method comprising the steps of utilizing a fastener as defined above, inserting the end cap of the fastener as a frictional fit into a threaded bore and subsequently tightening the bolt into the threaded bore.

BRIEF DESCRIPTION OF THE DRAWINGS

In order that the invention may be more readily understood, and so that further feature thereof may be appreciated, the invention will be described, by way of example, with reference to the accompanying drawings in which:

FIG. 1 is a diagrammatic side view of an air-bag in the form of a so-called "inflatable curtain" when in the inflated condition;

FIG. 2 is an enlarged view of an upper part of the inflatable curtain;

FIG. 3 is a side view of a bolt forming part of the fastener in accordance with the present invention;

FIG. 4 is a side view of an end cap to be mounted on the bolt of FIG. 3;

FIG. 5 is perspective view of the end cap; and

FIG. 6 is an enlarged partially broken away side view of the end cap.

DETAILED DESCRIPTION OF THE INVENTION

Referring initially to FIG. 1 of the accompanying drawings, the cabin of a motor vehicle 1 is illustrated showing, diagrammatically, an air-bag 2 in the form of an "inflatable curtain". The air-bag 2 is divided into a plurality of substantially vertical chambers or cells by seams provided within the air-bag 2, and the air-bag 2 is dimensioned to be received initially within a channel recess 3 which extends along the A post 4 of the vehicle, along the roof line 5 above the door openings and part way down the G post 6. Air-bags of this type are well known.

FIG. 2 illustrates part of the upper edge 7 of an inflatable curtain air-bag 2, showing that the air-bag 2 is provided with a plurality of spaced apart apertured lugs 8 and 9.

When the inflatable curtain air-bag 2 is to be mounted in the motor vehicle, typically, the inflatable curtain is in the form of a package subassembly, with the mounting lugs 8 and 9 protruding from the package. The mounting lugs 8 and 9 are to be aligned with corresponding threaded apertures formed in the A post 4, roof line 5, and C post 6 of the vehicle, and bolts are to be passed through the apertures and the apertured lugs to be engaged with the corresponding threaded apertures in the vehicle. It may require considerable manual dexterity for a single operative to hold the subassembly package air-bag in position and locate the bolts appropriately.

FIGS. 3 through 6 illustrate a fastener which may facilitate the task of mounting air-bag 2 to vehicle 1.

The fastener includes a bolt 10 which is provided, in the described embodiment, with a separated end cap 20. The end cap 20 has radially outwardly directed flanges adapted to effect a friction fit with a threaded bore dimensioned to receive the threaded part of the bolt.

Thus, in using the fastener of this invention, each fastener may be swiftly engaged with a threaded aperture simply by inserting the end cap 20 into a threaded aperture. Subsequently, the bolt 10 may be tightened in the conventional way.

FIG. 3 illustrates a metallic bolt 10. The bolt 10 is provided with a conventional hexagonal head 11 and a conventional threaded shank 12. At the free end of the threaded shank 12 there is an axially extending cylindrical projection 13 which terminates with a frustoconical head 14. An end cap 20 is to be received on the projection 13 at its head 14.

FIG. 4 illustrates an end cap 20 to be received on the bolt 10. The end cap 20 comprises a main cylindrical body portion 21. The body portion 21 is provided with an axially extending bore 22 dimensioned to receive the projection 13 and the head 14. The end cap 20 may thus be mounted on the bolt 10 in such a way that the end cap may rotate freely about the axis of the bolt.

The exterior of the cylindrical body 21 is provided with a plurality of radially outwardly directed flanges 23. The flanges 23 are evenly spaced along the length of the body 21. The flanges 23 have an outer diameter which is at least the same as the outer diameter of the threaded shank 12 of the bolt 10, but preferably at least some of the flanges 23 have a diameter greater than the diameter of the threaded shank 12 of the bolt 10.

As can be seen in FIGS. 4 and 5, at least some of the flanges 23 are segmented, so that each flange is in the form of four equi-angularly spaced separate sectors, the sectors of adjacent flanges being co-aligned to form channels or passages 24 between adjacent sets of sectors of the flanges.

As can be seen more clearly in FIG. 6 a terminal flange 25 is of relatively small diameter, the next adjacent flange 26 is of greater diameter and the next adjacent flange 27 is of even greater diameter, the remaining flanges having the same diameter as the flange 27.

It can be seen, from FIG. 6, that the forward facing lip of each flange is chamfered at 28 to facilitate the insertion of the end cap 20 into a threaded aperture.

A ridge 29 extends axially passing between adjacent flange sections.

It is to be appreciated that when a fastener of the kind shown in FIGS. 3-6 is used to secure an inflatable curtain air-bag 2 in position, each fastener may relatively easily be passed through an aperture formed in lugs 8 and 9 provided on the inflatable curtain air-bag 2 so that the end cap 20 becomes frictionally engaged within the threaded bore which is provided to receive the appropriate bolt. There is no need to ensure that the threading on the bolt 10 is aligned with the threading in The aperture and there is no need to rotate the bolt 10. A simple axial movement of the bolt 10 will force the end cap 20 into the threaded bore. The fact that the terminal flange 25 is of relatively small diameter will make it easy for that flange to become aligned with the bolt 10. The gradual increase in the sizes of the flanges 23 will facilitate the subsequent insertion of the end cap 20 into the threaded bore. The chamfering 28 provided at the leading edge of each flange 23 will facilitate a flexing of each flange as it is inserted into the bore, thus ensuring a good frictional grip between the flanges and the bores.

When all of the fasteners have been inserted in position in this way, the frictional grip effected by the fasteners to the threaded bores provided in the motor vehicle will be sufficient to hold the inflatable curtain air-bag 2 in position. Using a spanner, and applying further axial pressure, the threaded shank 12 of the bolt 10 of a fastener may then be brought into engagement with the threaded aperture and the bolt may be fastened in the conventional manner.

Whilst one embodiment of a fastener in accordance with the invention has been described, it is to be appreciated that many modifications may be effected. For example, the end cap 20 and the bolt 10 may be formed integrally, being molded of a single piece of appropriate plastic material. Whilst the end cap 20 has been illustrated as having substantially planar flanges 23, it is to be appreciated that the flanges may be angled in the form of barbs. Also it is to be appreciated that the end cap 20 may be provided with some other yieldable engagement structure to engage frictionally with the threaded bores. Thus the end cap 20 may be provided with an outer covering of a foam material, for example.

While the above description constitutes the preferred embodiment of the present invention, it will be appreciated that the invention is susceptible to modification, variation and change without departing from the proper scope and fair meaning of the accompanying claims.

The invention claimed is:

1. A fastener assembly for installation into a first bore, the fastener assembly comprising a bolt having a longitudinal axis, a bolt head, and a threaded shank extending from the bolt head, the shank terminating with an axially extending projection having an enlarged head, an end cap mounted on the axially extending projection of the shank remote from the bolt head, the end cap having an internal second bore dimensioned to receive the axially extending projection and the enlarged head, the end cap and the axially extending projection cooperating to be maintained in an assembled condition, the end cap is configured to be rotatable about the axis of the bolt, the end cap having a yieldable formation including a plurality of radially outwardly extending flanges to engage frictionally with the first bore when the end cap and the bolt are inserted axially into the first bore to retain the fastener assembly in the first bore, whereby the threaded shank of the bolt is configured to engage with the first bore when an axial pressure is applied to the fastener assembly.

2. A fastener assembly according to claim 1 wherein the end cap is a separate component which is secured to the bolt.

3. A fastener assembly according to claim 1 wherein at least some of the flanges have a diameter greater than the diameter of the threaded shank.

4. A fastener assembly according to claim 1 wherein at least some of the flanges have chamfered leading edges.

5. A fastener assembly according to claim 1 wherein at least some of the flanges are segmented.

6. A fastener assembly according to claim 1 wherein at least a terminal flange of the flanges has a diameter less than that of succeeding flange of the flanges.

7. A fastener assembly according to claim 1 wherein the end cap is made from a plastic material.

* * * * *